United States Patent [19]

Fujiwara

[11] 4,390,907
[45] Jun. 28, 1983

[54] MAGNETIC RECORDING SYSTEM
[75] Inventor: Tatsuo Fujiwara, Yokohama, Japan
[73] Assignee: Tokyo Shibaura Denki Kabushiki Kaisha, Kawasaki, Japan
[21] Appl. No.: 177,721
[22] Filed: Aug. 12, 1980

[30] Foreign Application Priority Data

Sep. 17, 1979 [JP] Japan .................. 54-119092

[51] Int. Cl.³ .................. G11B 5/00; G11B 5/02; G11B 5/09
[52] U.S. Cl. .................. 360/32; 360/29; 360/40
[58] Field of Search .................. 360/40, 44, 32, 29, 360/119

[56] References Cited

U.S. PATENT DOCUMENTS

| | | | |
|---|---|---|---|
| 3,012,234 | 12/1961 | Burns | 360/6 |
| 3,049,698 | 8/1962 | Thompson et al. | 360/119 |
| 3,230,517 | 1/1966 | Supernowicz | 360/119 |
| 3,405,232 | 10/1968 | Morrow et al. | 360/29 |
| 3,855,616 | 12/1974 | Schneider | 360/40 |
| 4,149,204 | 4/1979 | Marino et al. | 360/119 |
| 4,251,842 | 2/1981 | Iwasaki et al. | 360/119 |

OTHER PUBLICATIONS

Magnetic Tape Instrumentation by G. L. Davis, McGraw-Hill Book Co., ©1961, p. 15.

Primary Examiner—Vincent P. Canney
Attorney, Agent, or Firm—Oblon, Fisher, Spivak, McClelland & Maier

[57] ABSTRACT

A carrier wave at a frequency higher than the frequency of an input signal to be recorded is pulse width modulated with the input signal at the pulse width modulator, and the modulated signal thus obtained is supplied to a vertical magnetization recording head. The vertical magnetization recording head is held in contact with a magnetic tape having a rectangular hysteresis characteristic, and the modulated signal is recorded by vertical magnetization recording on the magnetic tape. The signal recorded by the vertical magnetization recording is reproduced with a reproducing head having a high sensitivity reproducing characteristic with respect to the input signal component of the pulse width modulation signal recorded on the recording medium and a low sensitivity characteristic with respect to the carrier wave component of the modulation signal.

11 Claims, 14 Drawing Figures

FIG. 10
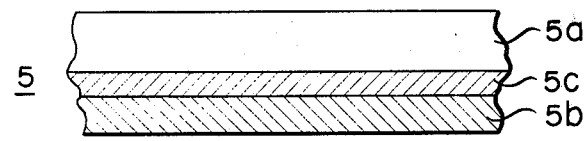
FIG. 11A   FIG. 11B
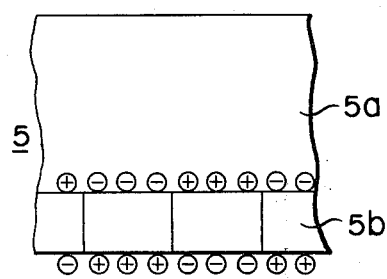 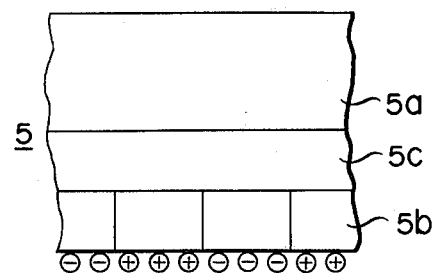
FIG. 12
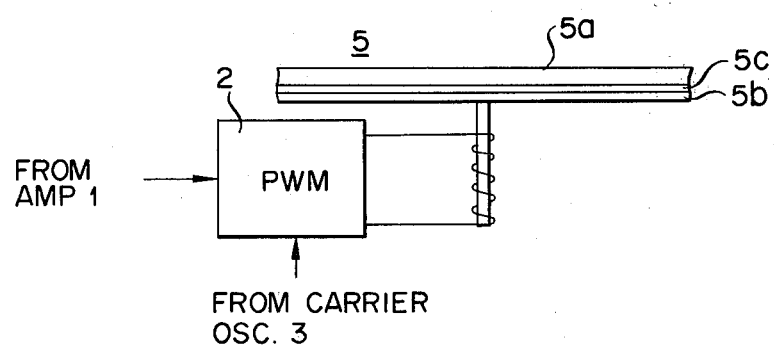

MAGNETIC RECORDING SYSTEM

This invention relates to a magnetic recording system provided with what is called a vertical magnetization recording means for effecting recording of signals by magnetizing a magnetic recording medium in the direction of the thickness thereof.

It has been expected that high density recording of signals can be obtained by the vertical magnetization recording. However, where the vertical magnetization recording is used for recording, for instance, an audio signal, the linearity of the reproduction of the audio signal, reproduced audio signal, reproduced with an ordinary reproducing head, is extremely deteriorated with its distortion being too serious to adopt this system for practical use. To overcome this drawback, it has been contemplated to use as the magnetic material of the magnetic recording medium what has as rectangular hysteresis curve as possible and record an audio signal by means of a PCM technique, for example, so that the remanance or residual magnetism of recording has a positive or negative saturation value. This method, however, requires a complicated circuit for converting an analog audio signal into a digital one at the time of the recording an equally complicated circuit for recovering the analog audio signal from the digital signal obtained from the reproducing head and also a very wide frequency band. Particularly, the higher the signal recording density it is the more difficulty to obtain the digital signal waveform with fidelity at the time of the reproduction, and there has hitherto been proposed no system, which permits recording and reproduction of signals of high density, superior linearity and less distortion with a simple construction.

In the meantime, a technique of recording analog signals as pulse width modulation (PWM) signals on a carrier wave by magnetization in the direction of the surface of a recording medium. In this PWM signal recording by magnetization in the direction of the surface of the recording medium, unlike the recording by magnetization in the vertical direction, high fidelity reproduction of the recorded PWM signals cannot be obtained except for very long wavelength. Accordingly, it has been in practice to extract the carrier wave component from the recorded signal and shape the waveform of the reproduced signal on the basis of the extracted carrier wave component. To this end, the carrier wave frequency has to be set within the frequency range, within which signals can be reproduced. In addition, since in the case of the recording by magnetization in the direction of the surface of the recording medium the frequency range capable of recording is somewhat narrower than the frequency range capable of reproduction, the carrier wave frequency is inevitably set within the frequency range capable of reproduction. Further, in order to be able to precisely reproduce the carrier wave it is necessary to set the carrier wave frequency to about one-tenth of the frequency range capable of reproduction; for example, where the frequency range capable of reproduction is 20 KHz, it is necessary to set the carrier frequency to about 2 KHz. Still further, regarding the relation between the carrier wave and the analog signal to be recorded, it is usually necessary to set the frequency range of the analog signal to be recorded to one-fifth to one-tenth of the carrier frequency. The frequencies of the analog signal to be recorded are restricted to be within a narrow range of the order of 400 Hz. This means that the PWM recording and reproduction by magnetization in the direction of the surface of the recording medium cannot be employed for signals covering a frequency range of the order of 20 KHz such as audio signals.

A first object of the invention is to provide a magnetic recording system based upon vertical magnetization, which is capable of recording signals of high density, superior linearity and less distortion and is simple in construction.

A second object of the invention is to provide a magnetic recording and reproducing system based upon vertical magnetization, which is capable of recording and reproducing signals of high density, superior linearity and less distortion and is simple in construction.

The first object of the invention is achieved by a magnetic recording system comprising a means for pulse width modulating a carrier wave with a frequency higher than the frequency of an input analog signal by said input analog signal, and a means for forming vertical magnetization corresponding to a pulse width modulated signal on a magnetic recording medium for the vertical magnetization.

The second object of the invention is achieved by a magnetic recording and reproducing system, in which an input analog signal is recorded in the form of a pulse width modulation (PWM) signal in a magnetic recording medium by vertical magnetization recording and at the time of the playback, only the analog signal component is directly extracted from the PWM modulation recorded by the vertical magnetization recording, with the carrier wave component removed, with a reproducing head by making positive use of a gap loss and a spacing loss of the reproducing head.

This invention can be more fully understood from the following detailed description when taken in conjunction with the accompanying drawings, in which:

FIG. 10 is a side view showing the structure of a magnetic tape suited for use in accordance with the invention;

FIGS. 11A and 11B are views showing the state of magnetization within magnetic tapes of respective single-layer and double-layer structures; and FIG. 12 is a schematic view showing a modification of the embodiment of FIG. 8.

Figure 1:
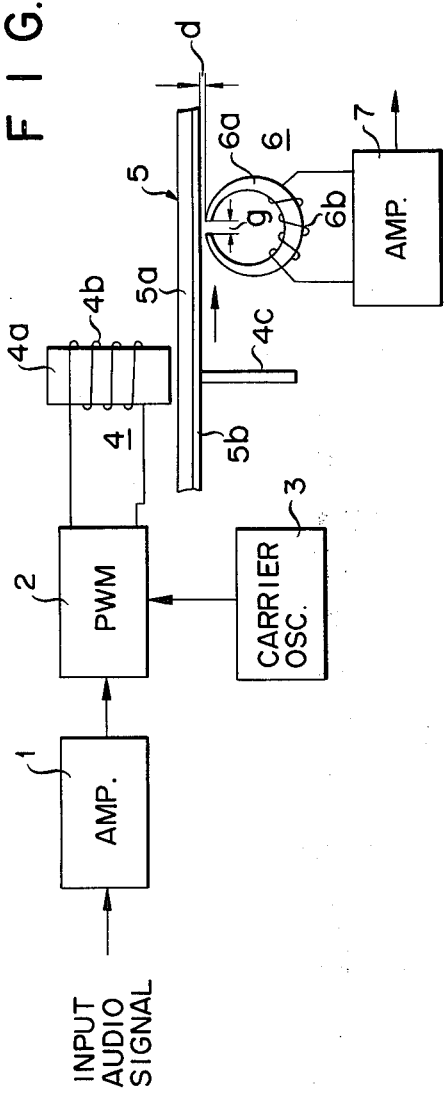
FIG. 1 is a schematic representation of an embodiment of the magnetic recording and reproducing system according to the invention.

Referring now to FIG. 1, an input signal, for instance an audio signal, to be recorded is amplified in an amplifier 1 to a predetermined level, and is then coupled to a pulse width modulator (PWM) 2. To the PWM 2 is supplied a carrier signal at a higher frequency than the frequency band of the input signal, i.e., audio signal, and in the PWM 2 the carrier signal is subjected to pulse width modulation with the audio signal. The highest frequency of the audio signal is about 20 KHz, and the carrier signal may have any frequency higher than 20 KHz; here, a carrier signal at 200 KHz, ten times as high as the highest audio frequency, is used. It is possible to record a short wavelength signal or a high frequency signal by using the vertical magnetization recording technique. Therefore, even the carrier signal of 200 KHz can easily be recorded.

Figure 2:
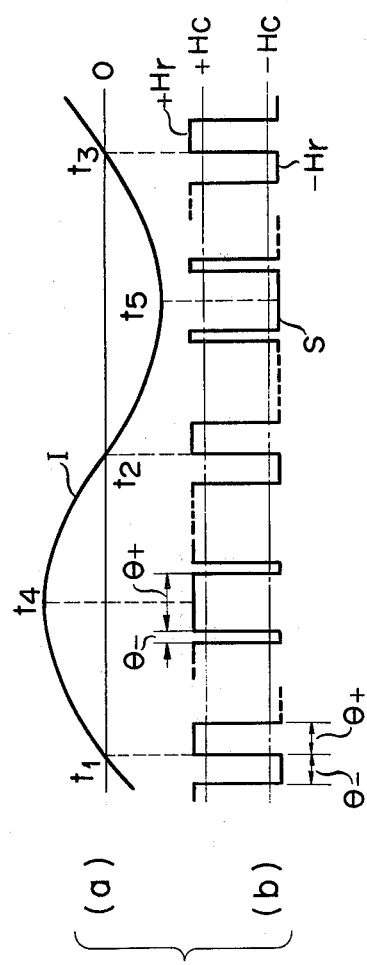
FIG. 2 is a waveform chart for input and output signals of a pulse width modulator shown in FIG. 1.

Pulse width modulation in the PWM 2 is such that with an audio signal of a waveform as shown in (a) in FIG. 2 a PWM signal of a waveform as shown in (b) in FIG. 2 is obtained. Thus, the pulses of FIG. 2(b) represent the signal of FIG. 2(a) at points t1, t4, t2, t5, and t3, respectively. As shown in (b) in FIG. 2, in one period of the PWM signal the pulse widths $\theta_-$ and $\theta_+$ of adjacent position and negative pulses are equal (the duty ratio being 50%) at instants $t_1$, $t_2$ and $t_3$, at which the audio signal I shown in (a) in FIG. 2 is at zero level, and the pulse width $\theta_+$ of the positive pulse is maximum at an instant $t_4$, at which the level $E_s$ of the audio signal L is maximum, and minimum at an instant $t_5$, at which the level $E_s$ is minimum. In this way, the pulse widths $\theta_+$ and $\theta_-$ are controlled according to the signal level $E_s$, that is, the pulse width modulation is effected with a relation $$E_s \propto \frac{\theta_+ - \theta_-}{\theta_+ + \theta_-}$$

After the PWM signal is modulated in the PWM 2 in the above way, it is supplied to an exciting coil 4b wound on an auxiliary pole piece 4a of a vertical magnetization recording head 4. This vertical magnetization recording head 4 also includes a main pole piece 4c facing the auxiliary pole piece 4a via a magnetic tape 5. One of the pole ends of the auxiliary pole piece 4a is slightly spaced apart from the front surface of a base film 5a of the magnetic tape 5 which is made of, for instance, polyester, and one of the pole faces of the main pole piece 4c is in contact with a magnetic layer 5b formed on the base film 5a of the magnetic tape 5. For the magnetic layer 5b a sputtered layer of, for example, a cobalt-chromium alloy can be used as the magnetic material suited for the effective vertical magnetization. The dimensions of the auxiliary and main pole pieces 4a and 4c in the direction of progress of the magnetic tape 5 as shown by an arrow are respectively several hundred micrometers and several micrometers.

With the PWM signal impressed upon the exciting coil 4b a recording flux is produced within the auxiliary pole piece 4a. This recording flux passes through the magnetic tape 5 and is focused on the main pole piece 4c. As a result, the tip portion of the main pole piece 4c is intensively magnetized. Thus, at the place near to the tip portion of the main pole piece 4c intensive vertical magnetic field based on the concentrated magnetic flux is generated, and vertical magnetization corresponding to the PWM signal is produced in the magnetic layer 5b.

Figure 3:
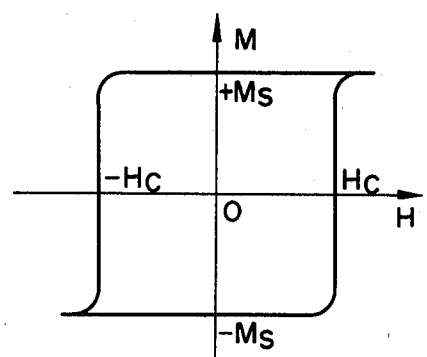
FIG. 3 is a graph showing a rectangular hysteresis characteristic of a magnetic layer of a magnetic tape used according to the invention.

The vertical magnetization recording is effected in the above way. For example, during the period of the pulse width $\theta_-$ before the instant $t_1$, at which the signal level of the audio signal I in FIG. 2 goes from positive to negative, the magnetization level of the magnetic layer 5b is $-M_s$ in FIG. 3, while for the subsequent period of the pulse width $\theta_+$ after the instant $t_1$ a positive magnetic field in excess of the magnetization switching field $H_c$ of the magnetic layer 5b is given. By so doing, the magnetization $-M_s$ is suddenly inverted to $+M_s$ at the value of $+H_c$. Thus, the amplitude of the PWM signal current S supplied to the exciting coil 4b has to be as great as is sufficient for producing a field $+H_c$ higher than the magnetization switching field $+H_c$ of the magnetic layer 5b. In this way, vertical magnetization corresponding to, for instance, the PWM signal S as shown in FIG. 2 is taken place in the magnetic layer 5b.

The reproduction of signals which are recorded by the vertical magnetization recording in the magnetic tape 5 can be made with a reproducing head of an ordinary construction. In FIG. 1, a reproducing head 6 has a ring-shaped head core 6a, and it is disposed such that a distance d is provided between it and the magnetic layer 5b of the tape 5. It has a gap g, and a reproducing coil 6b wound on its head core 6a is connected to input terminals of a reproducing amplifier 7.

In the vertical magnetization recording, unlike the magnetization recording in the direction of the surface of the recording medium, it is possible to obtain a reproduced signal of high fidelity with respect to the recording signal. Thus, unlike the PWM recording and reproducing system, in which signals are recorded and reproduced in the direction of the surface of the recording medium, there is no need of shaping the waveform of the PWM signal on the basis of the carrier signal as the reference signal, that is, there is no need of reproducing the carrier wave. For this reason, it is possible to set a frequency range, within which signals can be reproduced with a reproducing head, to a range lower than the carrier frequency.

Figure 4:
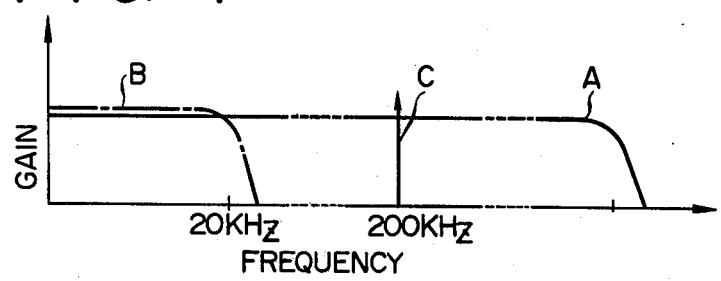
FIG. 4 is a graph showing a frequency range capable of recording a signal by vertical magnetization recording and another frequency range capable of reproducing a recorded signal by a ring type reproduction head.

FIG. 4 shows the relation among the frequency range A capable of vertical magnetization recording, the frequency range B capable of reproduction and the carrier frequency C.

Where the PWM signal is recorded by the vertical magnetization recording in this way, the carrier frequency can be set to a high frequency outside the frequency range capable of reproduction by the reproducing head. Also, since by the vertical magnetization recording even the signal at such a high frequency can be recorded, the carrier frequency and the frequency range capable of reproduction can be set as shown in FIG. 4. Thus, it is possible to take the entire frequency range capable of reproduction as the frequency range of the analog signal to be recorded, so that it is possible to extend the frequency range of signals which can be efficiently recorded and reproduced compared to the case of recording and reproducing PWM signals by the magnetization in the direction of the surface of the recording medium.

According to the invention, since the frequency range capable of reproduction can be set as shown in FIG. 4, it is possible to remove the carrier component and derive only the signal frequency component at the time of the reproduction by deftly making use of the spacing loss due to the afore-mentioned space d of the reproducing head and gap loss due to the gap g or the reproducing head as will be described hereinafter in detail.

The recording wavelength $\lambda_c$ of the pulse width modulated signal on the tape 5 is proportional to the speed v of tape travel of the tape 5 and is inversely proportional to the carrier wave frequency $f_c$, that is; there is a relation $$\lambda_c = v/f_c$$

Also, the wavelength of the input signal $\lambda_s$ is given as $$\lambda_s = v/f_s$$

where $f_s$ is the frequency thereof.

Figure 5:
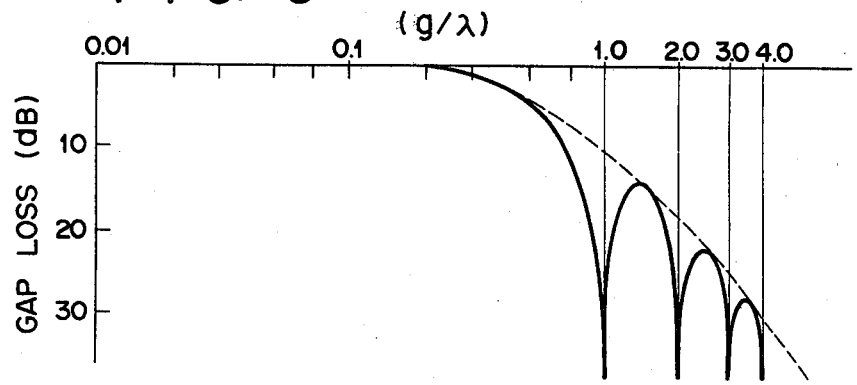
FIG. 5 is a graph showing a relation between the gap loss and the ratio $(g/\lambda_c)$ of gap to wavelength.

FIG. 5 shows the gap loss and the ratio $g/\lambda_s$ of the gap g of the reproducing head 6 to the wavelength $\lambda_s$ of the recording signal. As is seen from FIG. 5, when the gap g and wavelength $\lambda_s$ are equal ($g = \lambda_s$) the gap loss is above 30 dB, and also it is very high when $g/\lambda_s$ is an integral number such as 2, 3, ... . Further, it is thought that the gap loss is almost zero if the gap g is very small with respect to the wavelength $\lambda_s$ ($\lambda_s \gg g$).

Thus, by setting the recording signal wavelength $\lambda_s$ to be greater than ($\lambda_s > g$) it is possible to detect the signal frequency component with high sensitivity and in a reduced gap loss state.

Meanwhile, it is desirable that the gap g is set with respect to the carrier signal wavelength $\lambda_c$ such that the gap loss is as high as possible at the time of the reproduction. This means that the gap g may be set to a value greater than the carrier signal wavelength $\lambda_c$ ($g > \lambda_c$) and also that $g/\lambda_c$ is approximately a positive integer.

From the above considerations, it will be seen that by setting the gap g of the reproducing head 6 such that $$\lambda_s > g > \lambda_c$$

it is possible to remove the carrier wave component and detect only the signal frequency component with high sensitivity.

Figure 6:
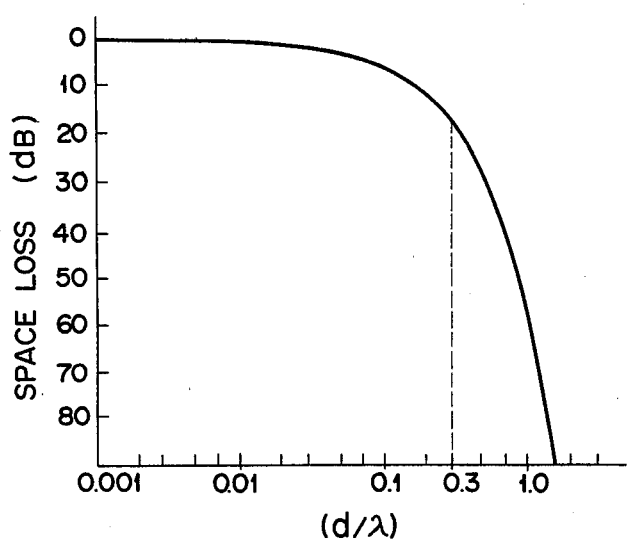
FIG. 6 is a graph showing a relation between the space loss and the ratio $(d/\lambda_c)$ of space to wavelength.

FIG. 6 shows a relation between the space loss $L_s$ and the ratio $d/\lambda_c$ of the space d between the end of the reproducing head 6 and the recording head 5 to the carrier signal wavelength $\lambda_c$. This relation is mathematically expressed as $$L_s = \exp(-2\pi d/\lambda_c)$$

It will be seen from FIG. 5 that the space loss $L_s$ is suddenly increased when the value of $d/\lambda_c$ exceeds 0.3. Thus, by setting the space d such that the ratio $d/\lambda_c$ of the space d to the carrier signal wavelength $\lambda_c$ is above 0.3, sufficiently high space loss with respect to the carrier wave component can be obtained to effectively suppress the extraction of the carrier wave component by the reproducing head 6. Since the carrier frequency is set to 200 KHz, i.e., ten times the audio signal frequency of 20 KHz, the ratio of $\lambda_s$ to $\lambda_c$ is 10:1. Thus, even with $d/\lambda_c > 0.3$ the requirement $d/\lambda_s < 0.3$ can be met to make the space loss with respect to the signal frequency extremely low. This means that it is possible to pick up only the signal frequency component with high sensitivity in a state of low space loss as well.

Figure 7A:
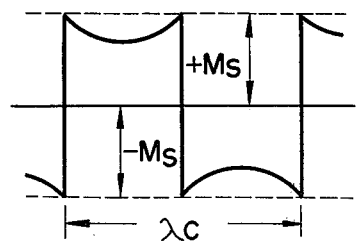
FIGS. 7A and 7B are views showing relations between recording reproduction M and wavelength of the carrier wave.
Figure 7B:
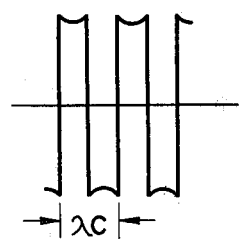

In the meantime, when recording a rectangular PWM signal by vertical magnetization recording, the values $\pm M_s$ of magnetization for recording cannot be maintained and are reduced in a central portion of the pulse due to the effect of a demagnetizing field within the magnetic layer 5b of the recording tape 5 in case where the carrier wavelength is long, as shown in FIG. 7A. If there is such local reduction of the magnetization M, the linearity of the reproduced signal is lost. To reduce the effect of the demagnetizing field within the recording medium the wavelength $\lambda_c$ of the carrier wave may be reduced to be $$\lambda_c < \delta$$

where $\delta$ is the thickness of the magnetic layer 5b of the tape. In such case, the magnetization M for recording is as shown in FIG. 7B, and it is possible to satisfactorily maintain the rectangularness of the remanance. In the vertical magnetization recording the wavelength of the carrier wave has to be reduced for increasing the recording density, and the condition $\lambda_c$ is convenient from this point as well.

With the above measures, the signal reproduced by the reproducing head 6 does not have a carrier (high frequency) wave component and has a waveform close to that shown in (a) in FIG. 2, and it is amplified by the amplifier 7 and then, the amplified signal is delivered from the amplifier 7. In other words, $$E_0 \propto \frac{\theta_+ - \theta_-}{\theta_+ + \theta_-} \propto E_s$$

Figure 8:
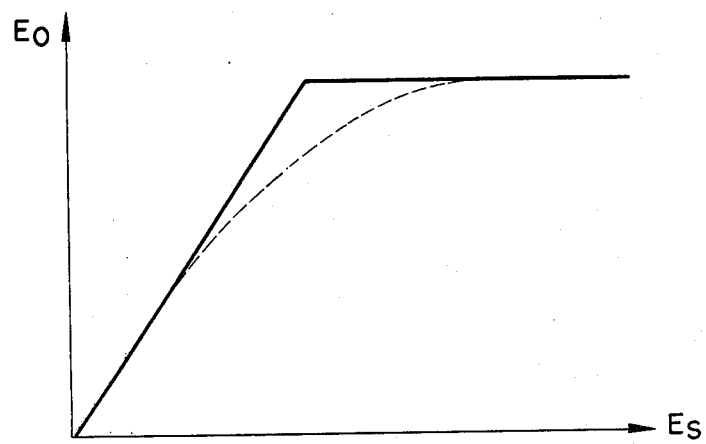
FIG. 8 is a graph comparing the linearily obtainable with the system according to the invention and that of the prior art.

This means that only the signal frequency component is taken out, that is, in the reproduction a perfect proportional relation between the input $E_s$ and output $E_0$ is maintained up to the saturation level as shown by solid line in FIG. 8. Dashed curve in FIG. 8 shows the playback characteristic of the prior-art AC bias system. In this case, the linearity can be maintained only up to about one-third of the saturation level, and the dynamic range is narrow. According to the invention, the linearity can be improved by providing for a sufficiently wide dynamic range.

Figure 9:
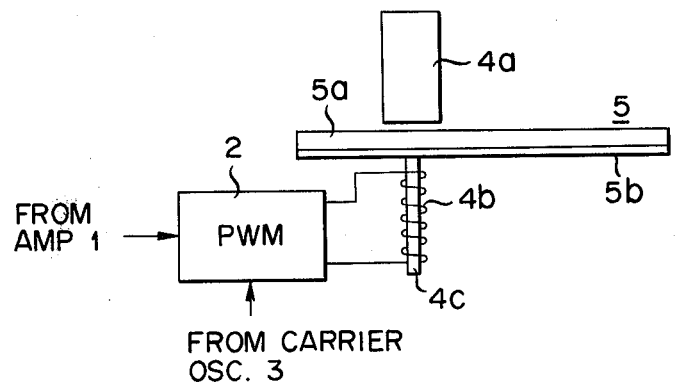
FIG. 9 is a schematic view showing another embodiment of the invention.

While in the embodiment of FIG. 1 the output of the PWM 2 is supplied to the exciting coil 4b wound on the auxiliary pole piece 4a, it is also possible to adopt a construction as shown in FIG. 9, which is the same as the construction of FIG. 1 except for that the exciting coil 4b supplied with the output of the PWM 2 is wound on the main pole piece 4c.

As the magnetic recording tape for the vertical magnetization recording may be used, in addition to the one shown in FIG. 1 having one magnetic layer 5b formed on one side of the base film 5a, a magnetic tape 5 of a construction shown in FIG. 10, in which an additional layer 5c of, for example, Fe-Ni is provided between the base film 5a and the magnetic layer 5b which may be a Co-Cr sputtered film. The magnetic layer 5c consists of a high permeability magnetic material such as Permalloy. With this double-layer structure constituted by the magnetic layers 5b and 5c, it is possible to reduce the inverse magnetic field due to the inverse magnetic charge produced on the side of the magnetic layer 5b facing the base film 5a.

More particularly, in case of the structure having only one magnetic layer 5b as shown in FIG. 11A an inverse magnetic field is produced due to inverse magnetic charge on the side of the layer 5b in contact with the base film 5a, so that the correct rectangular waveform of the remanance cannot be maintained. With the double layer structure as shown in FIG. 11B the inverse magnetic charge produced on the back side of the magnetic layer 5b is absorbed by the high permeability magnetic layer 5c, so that the remanance waveform is improved.

Thus, where the magnetic tape of the double layer structure having the magnetic layers 5b and 5c, the auxiliary pole 4a shown in FIG. 9 may be omitted, that is, the recording head 4 for the vertical magnetization recording may consist of the sole main pole 4c as shown in FIG. 12. With this construction, high density recording by vertical magnetization recording may be obtained similar to the embodiments of FIGS. 1 and 9.

As has been described in the foregoing, with the vertical magnetization recording and reproducing system according to the invention it is possible to obtain analog recording of superior linearity on a magnetic recording medium having a rectangular hysteresis curve. Besides, it is possible to ensure perfect linearity up to the saturation level of the recording medium to provide a wide dynamic range for the recording and reproduction of signals. Further, it is possible to expect wide improvement of the distortion, dynamic range, signal-to-noise ratio, etc. compared to the prior-art AC bias system. Furthermore, in spite of the fact that according to the invention the recording system is different from that in the prior-art PWM system, an ordinary reproducing system can be used for the reproduction; that is, according to the invention the versatility is superior. Further, while with the prior-art AC bias system it has been necessary to reduce the distortion by sufficiently improving the linearity of the recording amplifier, with the system according to the invention this linearity can be ignored since the pulse waveform that is handled is obtained by mere pulse width modulation. Further, according to invention the power efficiency is improved compared to the prior-art AC bias system dealing with analog waveforms, and magnetic saturation less effected with respect to the recording and reproducing magnetic heads.

The above embodiments are by no means limitative. For example, it is possible to employ various pulse width modulation systems, and also it is possible to suitably set the carrier frequency so long as it is higher than the frequency of the input signal to be recorded.

What is claimed is:

1. A magnetic recording and reproducing system comprising a means for pulse width modulating a carrier wave with a frequency higher than the frequency of an input signal by said input signal, a means for vertical magnetization recording said pulse width modulation of the carrier wave on a magnetic recording medium, and a reproducing means for reproducing the input signal recorded on the magnetic recording medium, means having a high sensitivity characteristic with respect to the input signal component of the modulation recorded in said recording medium and a low sensitivity characteristic with respect to the carrier wave component of the modulation.

2. A magnetic recording and reproducing system according to claim 1, wherein said reproducing means have a reproducing characteristic capable of reproducing only signals within a frequency range lower than at least the frequency of said carrier wave.

3. A magnetic recording and reproducing system according to claim 1, wherein said vertical magnetization recording means includes a vertical magnetization recording head having an auxiliary pole piece with one pole face thereof disposed in the close proximity of one surface of said magnetic recording medium, an exciting coil wound on said auxiliary pole piece, said pulse width modulation of the carrier wave being supplied to said exciting coil, and a main pole piece provided on the side of said magnetic recording medium opposite said auxiliary pole piece and thinner than said auxiliary pole piece, said main pole piece having one pole face disposed in contact with the other surface of said magnetic recording medium.

4. A magnetic recording and reproducing system according to claim 1, wherein said vertical magnetization recording means includes a vertical magnetization recording head having an auxiliary pole piece with one pole face thereof disposed in the close proximity of one surface of said magnetic recording medium, a main pole piece provided on the side of said magnetic recording medium opposite said auxiliary pole and thinner than said auxiliary pole piece, said main pole having one pole face disposed in contact with the other surface of said magnetic recording medium, and an exciting coil wound on said main pole piece, said pulse width modulation of the carrier wave being supplied to said exciting coil.

5. A magnetic recording and reproducing system according to claim 1, wherein said vertical magnetization recording means includes a vertical magnetization recording head having a main pole piece with one pole face thereof disposed in contact with one surface of said magnetic recording medium, and an exciting coil wound on said main pole piece, said modulation of the carrier wave being supplied to said exciting coil.

6. A magnetic recording and reproducing system according to claims 3, 4 or 5, wherein said reproducing means includes a head core having a gap (g) of a predetermined dimension and spaced apart a distance (d) from the corresponding surface of said magnetic recording medium and a reproducing coil wound on said head core, said gap (g) being set such as to satisfy a relation $$\lambda_s > g > \lambda_c$$

with respect to the wavelength $\lambda_s$ of said input signal and the wavelength $\lambda_c$ of the said carrier wave, said distance (d) being set such that the ratio $d/\lambda_c$ of said distance (d) to said carrier wave wavelength ($\lambda_c$) is above 0.3.

7. A magnetic recording and reproducing system according to claim 6, wherein said gap (g) is set such that the ratio of said gap (g) to said carrier wave wavelength ($\lambda_c$) is an integral number greater than 1.

8. A magnetic recording and reproducing system comprising a means for pulse width modulating a carrier wave at a frequency higher than the frequency of an input signal with said input signal, a means for vertical magnetization recording said pulse width modulated carrier wave on a magnetic recording medium having a rectangular hysteresis characteristic after conversion into a recording field of a greater amplitude than the magnetization switching field of said magnetic recording medium, and a reproducing means for reproducing the input signal recorded on the magnetic recording medium, said reproducing means including a head core having a gap (g) of a predetermined dimension and a reproducing coil wound on said head core, said gap (g) being set such as to satisfy a relation $$\lambda_s > g > \lambda_c$$

with respct to the wavelength $\lambda_s$ of said input signal and the wavelength $\lambda_c$ of said carrier wave.

9. A magnetic recording and reproducing system comprising a means for pulse width modulating a carrier wave at a frequency higher than the frequency of an input signal with said input signal, a means for vertical magnetization recording said pulse width modulated carrier wave on a magnetic recording medium having a rectangular hysteresis characteristic after conversion into a recording field of a greater amplitude than the magnetization switching field of said magnetic recording medium, and a reproducing means for reproducing the input signal recorded on the magnetic recording medium, said reproducing means including a head core and a reproducing coil wound on said head core, said head core being spaced apart a distance (d) from the corresponding surface of said magnetic recording medium, said distance (d) being set such that the ratio $d/\lambda_c$ of said distance (d) to said carrier wave wavelengths ($\lambda_c$) is above 0.3.

10. A system according to claims 1, 3, 4, 5, 8 or 9, wherein said magnetic recording medium includes a base film and a magnetic layer formed on said base film.

11. A magnetic recording and reproducing system according to claim 10, wherein said magnetic recording medium further includes a second magnetic layer provided between said base film and said first-mentioned magnetic layer and consisting of a high permeability magnetic material.

* * * * *